(12) United States Patent
Perfetti

(10) Patent No.: US 10,228,270 B2
(45) Date of Patent: Mar. 12, 2019

(54) MEASURING TUBE FOR INSERTION IN A MEASURING TUBE RECEPTACLE OF A MAGNETIC-INDUCTIVE FLOWMETER AND A MAGNETIC-INDUCTIVE FLOWMETER

(71) Applicant: Krohne AG, Basel (CH)

(72) Inventor: Christine Perfetti, Chatuzange le Goubet (FR)

(73) Assignee: KROHNE AG, Basel (CH)

( * ) Notice: Subject to any disclaimer, the term of this patent is extended or adjusted under 35 U.S.C. 154(b) by 63 days.

(21) Appl. No.: 15/687,663

(22) Filed: Aug. 28, 2017

(65) Prior Publication Data

US 2018/0087941 A1 Mar. 29, 2018

(30) Foreign Application Priority Data

Sep. 25, 2016 (DE) .......................... 10 2016 118 064

(51) Int. Cl.
*G01F 1/58* (2006.01)
*G01F 15/14* (2006.01)
*G01F 15/18* (2006.01)

(52) U.S. Cl.
CPC ................ *G01F 1/584* (2013.01); *G01F 1/58* (2013.01); *G01F 1/588* (2013.01); *G01F 15/14* (2013.01); *G01F 15/18* (2013.01)

(58) Field of Classification Search
CPC ............. G01F 1/58; G01F 15/14; G01F 15/18
See application file for complete search history.

(56) References Cited

U.S. PATENT DOCUMENTS

| 3,346,604 | A | 10/1967 | Roberts, Jr. |
| 4,195,515 | A | 4/1980 | Smoll |
| 4,346,604 | A | 8/1982 | Snook et al. |
| 7,194,918 | B2 * | 3/2007 | Brockhaus .............. G01F 1/586 73/861.12 |
| 8,136,412 | B2 * | 3/2012 | Yamamoto ................ G01F 1/58 73/861.12 |
| 9,482,564 | B2 * | 11/2016 | Heijnsdijk .............. G01F 1/586 |
| 2016/0258794 | A1 | 9/2016 | Perfetti et al. |

FOREIGN PATENT DOCUMENTS

DE   10 2009 031 873 A1   1/2011

\* cited by examiner

*Primary Examiner* — Jewel V Dowtin
(74) *Attorney, Agent, or Firm* — David S. Safran; Roberts Mlotkowski Safran Cole & Calderon, P.C.

(57) ABSTRACT

A measuring tube for insertion in a measuring tube receptacle of a magnetic-inductive flowmeter and for guiding a medium, with two electrodes for tapping a voltage induced in the medium, wherein the electrodes each extend at least from a medium contact area to a connecting contact area on one end for connection to an evaluating unit. The electrodes are arranged on both sides of the measuring tube in an electrode plane situated perpendicularly on the longitudinal axis of the measuring tube and the electrodes extend parallel to one another and tangential to the measuring tube. The connecting contact areas on the ends of both electrodes are arranged on one side of a reference plane, which is situated perpendicularly on the electrode plane, and wherein the medium contact areas are located at least partially in the reference plane.

10 Claims, 6 Drawing Sheets

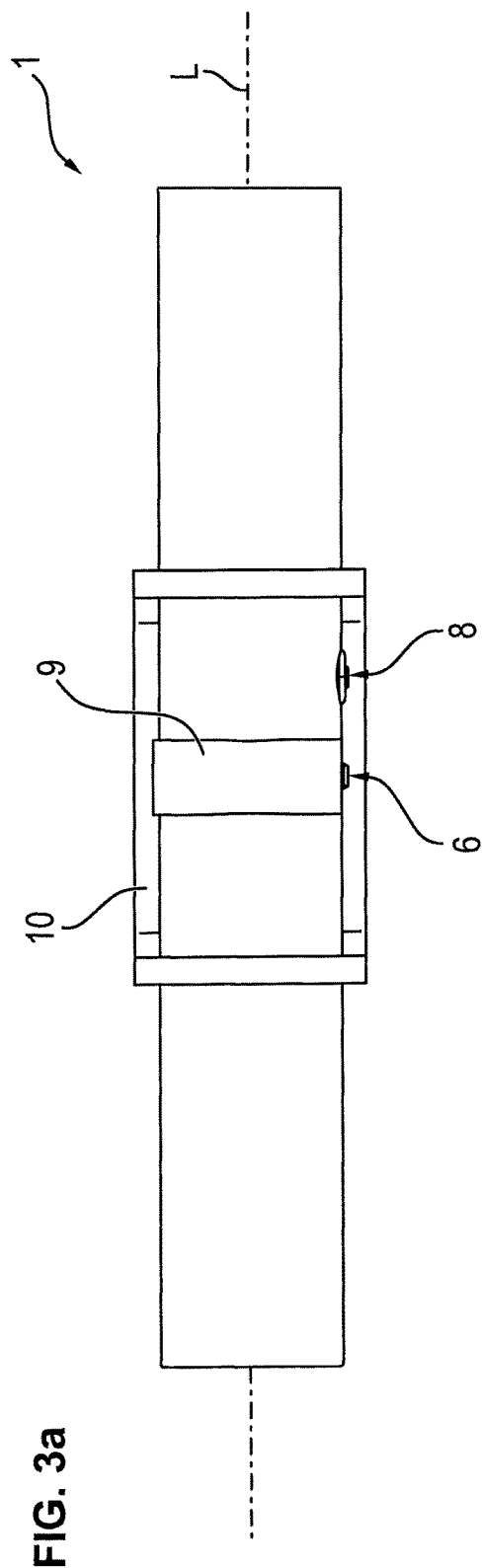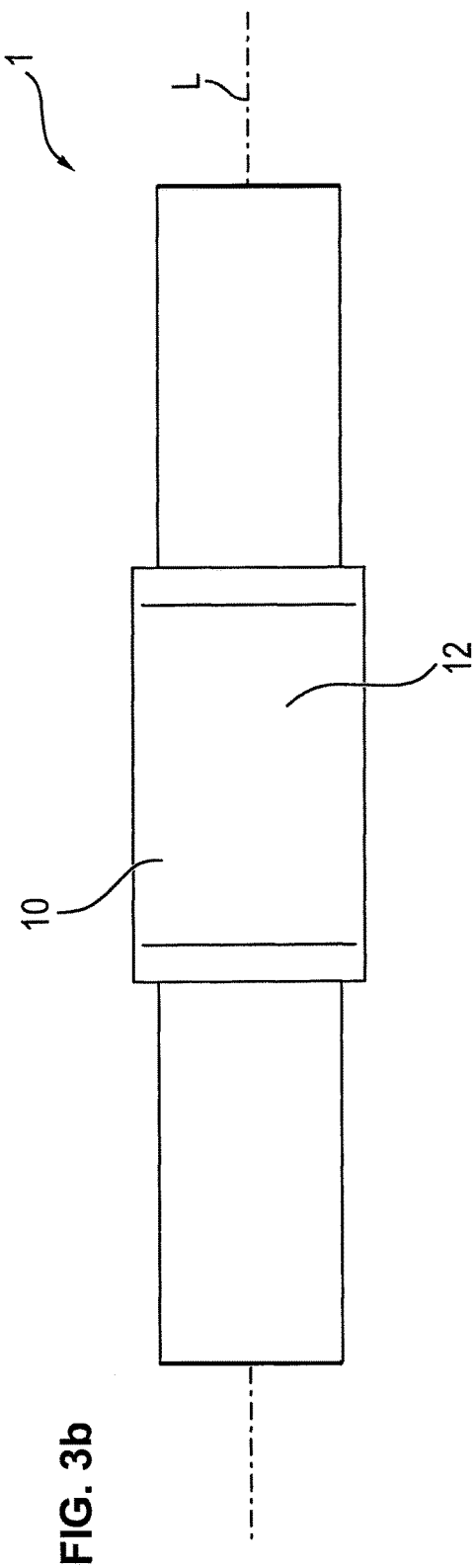

MEASURING TUBE FOR INSERTION IN A MEASURING TUBE RECEPTACLE OF A MAGNETIC-INDUCTIVE FLOWMETER AND A MAGNETIC-INDUCTIVE FLOWMETER

BACKGROUND OF THE INVENTION

Field of the Invention

The invention relates to a measuring tube for insertion in a measuring tube receptacle of a magnetic-inductive flowmeter and for guiding a medium, with two electrodes for tapping a voltage induced in the medium, wherein the electrodes each extend at least from one medium contact area to a connecting contact area on one end for connection to an evaluating unit, wherein the electrodes are arranged on both sides of the measuring tube in an electrode plane situated perpendicularly on the longitudinal axis of the measuring tube and the electrodes extend parallel to one another and tangential to the measuring tube. Furthermore, the invention relates to a magnetic-inductive flowmeter for determining the flow of a medium flowing through an exchangeable measuring tube, with a measuring device housing, with a magnetic field generator for generating a magnetic field permeating the measuring tube, with a measuring tube receptacle designed in the measuring device housing for receiving the exchangeable measuring tube, and with counter-contacts arranged in the measuring tube receptacle for contact to the electrodes encompassed by the measuring tube via connecting contact areas of the electrodes.

Description of Related Art

Magnetic-inductive flowmeters have been known for a long time. The measuring principle is based on the action of force on the charges present in the flowing medium in a magnetic field and the measurement of the electrical potential difference that is generated by the spatial separation of charges.

Magnetic-inductive flowmeters are also known that have an exchangeable measuring tube, for example, as this is necessary for hygiene purposes. This is shown, for example, in German Patent Application DE 10 2013 019 067 A1 or in U.S. Pat. No. 3,346,604.

It can be easily seen that a magnetic-inductive flowmeter having an exchangeable measuring tube has to be carefully designed and constructed, in particular in terms of its mechanical design. Owing to the principles involved, there is a risk that measuring inaccuracies result solely from the measuring tube having not been inserted in the receptacle of the corresponding nuclear-magnetic flowmeter with the necessary precision. The electric contacting of the electrodes of the measuring tube by the counter-contacts of the measuring tube receptacle can also be a critical point. Here, reproducible electric contacts have to be guaranteed.

SUMMARY OF THE INVENTION

The object of the invention is to provide a measuring tube for insertion in a measuring tube receptacle of a magnetic-inductive flowmeter and a corresponding magnetic-inductive flowmeter, which allows for a simple and reliable handling of the components while inserting and exchanging the measuring tube.

The object is initially and essentially achieved by the measuring tube according to the invention in that the connecting contact areas on the ends of both electrodes are arranged on one side of a reference plane situated perpendicularly on the electrode plane, and wherein the medium contact areas are located at least partially in the reference plane. According to the invention, it is also achieved that a contact of the electrodes of the measuring tube occurs on one side. It is achieved by this design that a reliable contact has to be secured—and verified by the user—on only one side of the measuring tube, which simplifies handling.

It is noted, here, that the essential advantages of the measuring tube according to the invention can be explained, in part, especially easily in combination with the measuring tube receptacle of the magnetic-inductive flowmeter according to the invention. For this reason, the description of the measuring tube shall also encompass the flowmeter according to the invention, which is discussed in its entirety in the second part of the specification.

A design of the measuring tube of the type that has the connecting contact areas of both electrodes on one side of the defined reference plane, i.e. contact of the electrodes of the measuring tube occurs on one side, requires that the counter-contacts arranged on the measuring tube receptacle of the magnetic-inductive flowmeter are also arranged on one side. The advantages resulting from this are described further below.

In the measuring tube according to the invention, the use of rod electrodes has been seen to be particularly advantageous. The rod electrodes are joined tangentially to the measuring tube on both sides of the measuring tube, wherein the medium contact area of the electrodes is located essentially in the middle of the longitudinal extension of the rod electrodes. The use of rod electrodes, whose medium contact areas are located essentially in the middle of the longitudinal extension of the rod electrodes, is advantageous because the distance of the electrodes can be more easily and more exactly set than when the medium contact areas of the electrodes are arranged on the ends, i.e. the electrodes are perpendicular on the measuring tube surface.

The measuring tubes according to the invention are, for example, intended for single use. Since the measuring tubes are a "disposable product", the material costs of the measuring tube should be kept as low as possible. Accordingly, the use of plastic lends itself to the production of the measuring tube. Since the media to be measured are electrically conductive media and the measuring tube material—plastic—is an insulator, it is necessary that the medium is grounded. A preferred design of the measuring tube is thus wherein a grounding contact for grounding the medium is arranged on the measuring tube. In particular, the grounding contact has direct contact with the medium. Furthermore, the grounding contact is arranged on the side of the reference plane, on which the connecting contact areas of the electrodes are arranged. Contact of the grounding contact thus also takes place from the side, from which the contact of the connecting contact areas of the electrodes is carried out. Due to the grounding contacts being arranged in this manner, the advantages of the one-side contact are completely retained.

A preferred design of the measuring tube according to the invention is wherein a positioning device is incorporated for positioning the measuring tube in the measuring tube receptacle of the magnetic-inductive flowmeter. With the help of the positioning device, the measuring tube can be reproducibly inserted in the measuring tube receptacle. Even after repeated removal and insertion of the measuring tube or of diverse measuring tubes in the measuring tube receptacle, the measuring tube is located at the same position in the measuring tube receptacle.

The measuring tubes according to the invention are often used in the field of medicine or pharmaceuticals. For some applications, it is necessary that the measuring tubes are sterile. In the use of sterile measuring tubes, the positioning device has been seen to be advantageous because a calibration of each used measuring tube no longer needs to be carried out. This is valid, in particular provided that several measuring tubes are designed identically. It is thus possible to calibrate the magnetic-inductive flowmeter with a measuring tube that serves the purpose of calibration and does not have to be sterile. After calibration has been carried out, the unsterile measuring tube can be replaced by a structurally identical, sterile measuring tube that is positioned at the same place in the measuring tube receptacle as the measuring tube used for calibration, thanks to the positioning device. A renewed calibration is no longer necessary.

The positioning device can be designed in different manners. A preferred embodiment of the measuring tube according to the invention is wherein the positioning device is designed on the measuring tube as a U-shaped positioning frame. The U-legs of the positioning frame are each penetrated by the measuring tube. In particular, the U-base connecting the U-legs extends from U-leg to U-leg in the axial direction of the measuring tube, wherein the U-base plane defined by the U-base is situated perpendicularly on the electrode plane and perpendicularly on the reference plane.

The measuring tube with positioning frame is, for example, inserted in the measuring tube receptacle so that the positioning frame engages in recesses of the measuring tube receptacle or partially encompasses the measuring tube receptacle. Thereby, the advantage results in that, due to the positioning frame, the measuring tube blocks movements parallel to the U-base plane in the longitudinal direction of the measuring tube. The U-leg and the U-base of the positioning frame can, in particular, be formed as discs.

In addition to the measuring tube, the invention also relates to a magnetic-inductive flowmeter for determining the flow of a medium flowing through an exchangeable measuring tube, with a measuring device housing, with a magnetic field generator for generating a magnetic field permeating the measuring tube, with a measuring tube receptacle designed in the measuring device housing for receiving the exchangeable measuring tube, and with counter-contacts arranged in the measuring tube receptacle for contact to the electrodes encompassed by the measuring tube via connecting contact areas of the electrodes.

In the magnetic-inductive flowmeter, the object forming the basis of the invention is initially and essentially achieved in that the measuring tube receptacle is U-shaped, wherein the magnetic field at least partially perpendicularly permeates the U-legs, that the measuring tube receptacle has an opening perpendicular to the magnetic field in the area of the unconnected ends of the U-legs for receiving the measuring tube, and that the counter-contacts are formed on one of the U-legs.

When it is said that the magnetic field at least partially perpendicularly permeates the U-legs of the measuring tube receptacle, then this can be implemented in that the magnetic field generator has pole shoes that reach into the U-legs and thus, themselves, form a part of the measuring tube receptacle. In this manner, there is a pole shoe in each of the two U-legs, so that the magnetic field running between the pole shoes at least partially perpendicularly permeates the measuring tube receptacle. In order to receive the measuring tube in the measuring tube receptacle, the measuring tube receptacle has an opening that extends perpendicularly to the magnetic field.

Since the counter-contacts are formed on a U-leg, contact of the measuring tube takes place on one side. This has the advantage that the leads to the counter-contacts do not run through the magnetic circuit and thus influence is reduced.

In order to insert the measuring tube into the measuring tube receptacle and for contact, the measuring tube is initially inserted through the opening in the measuring tube receptacle using a movement perpendicular to the magnetic field. Contact then subsequently takes place using a movement of the measuring tube parallel to the magnetic field.

A preferred design of the magnetic-inductive flowmeter according to the invention is wherein the counter-contacts are flexibly designed, so that in the "in contact" state of the measuring tube, the counter-contacts exert a spring force on the connecting contact areas of the electrodes of the measuring tube. In this design, the advantage results that a contact of the electrodes is carried out flexibly. If the counter-contacts were not flexibly designed, then the measuring tube and the measuring tube receptacle would have to be formed so exactly, that the connecting contact areas of the electrodes and the counter-contacts converge exactly, since contact can no longer occur by minimal deviation. By inserting the measuring tube into the measuring tube receptacle, the counter-contacts are "pushed downward" by the electrodes, namely in that the electrodes extend into the area of the non-tensioned counter-contacts and the counter-contacts are thus "tensioned" and a spring force is exerted on the connecting contact areas of the electrodes.

In a further preferred design, it is provided that the ends of the counter-contacts, which come into electric contact with the connecting contact areas of the electrodes of the measuring tube, are mechanically encoded, for example, are either conically molded out or conically molded in. Accordingly, it is then provided according to the invention in the previously-treated measuring tube that the connecting contact areas of the electrodes are mechanically counter-encoded, for example, either conically molded in or conically molded out. Mechanical encoding and counter-encoding correspond to one another and cause the measuring tube in the measuring tube receptacle to be self-centering in the measuring tube receptacle solely by the design of the connecting contact areas.

A further design of the magnetic-inductive flowmeter according to the invention is wherein the measuring tube receptacle incorporates a grounding counter-contact for contacting a grounding contact on the measuring tube. The grounding counter-contact is formed on the U-leg, on which the counter-contacts are formed. The grounding counter-contact is then necessary, when the measuring tube is manufactured of an insulating material and has a grounding contact for grounding the conductive medium. The grounding counter-contact is formed on the same U-leg, on which the counter-contacts for contact to the connecting contact areas of the electrodes are formed, in order to guarantee that the advantages achieved by the one-sided contact of the electrodes of the measuring tube are not lost, i.e. all contacts occur on one side.

According to the invention, it can be provided in one design of the magnetic-inductive flowmeter that at least one U-leg and/or the U-base of the measuring tube receptacle has a counter holding profile, in which a positioning frame of the measuring tube can be engaged. Hereby, the measuring tube can be reproducibly positioned in the measuring tube receptacle, whereby a use of sterile measuring tubes is made possible, since each measuring tube no longer has to be individually calibrated.

A further design of the magnetic-inductive flowmeter according to the invention is wherein a closure element is incorporated for closing the opening of the measuring tube receptacle. It is thereby prevented that the measuring tube can slip out of the opening.

It is provided in one design, that the closure element is implemented as a pivotable flap formed on the measuring device housing. It is advantageous that the flap is free of connecting contacts, since the contact of the connection contact areas of the electrodes takes place using the counter-contacts of the measuring tube receptacle.

The flap, in particular, has a profile for receiving the measuring tube. It is hereby achieved that the measuring tube in the measuring tube receptacle is blocked for movements in the direction of extension of the electrodes.

In detail, there are different possibilities for designing and further developing the measuring tube according to the invention and the magnetic-inductive flowmeter according to the invention as will be apparent from the description of preferred embodiments in conjunction with the accompanying drawings.

BRIEF DESCRIPTION OF THE DRAWINGS

FIG. 3a is a first side view of the measuring tube depicted in FIG. 1,

FIG. 3b is a second side view of the measuring tube depicted in FIG. 1,

DETAILED DESCRIPTION OF THE INVENTION

Figure 1:
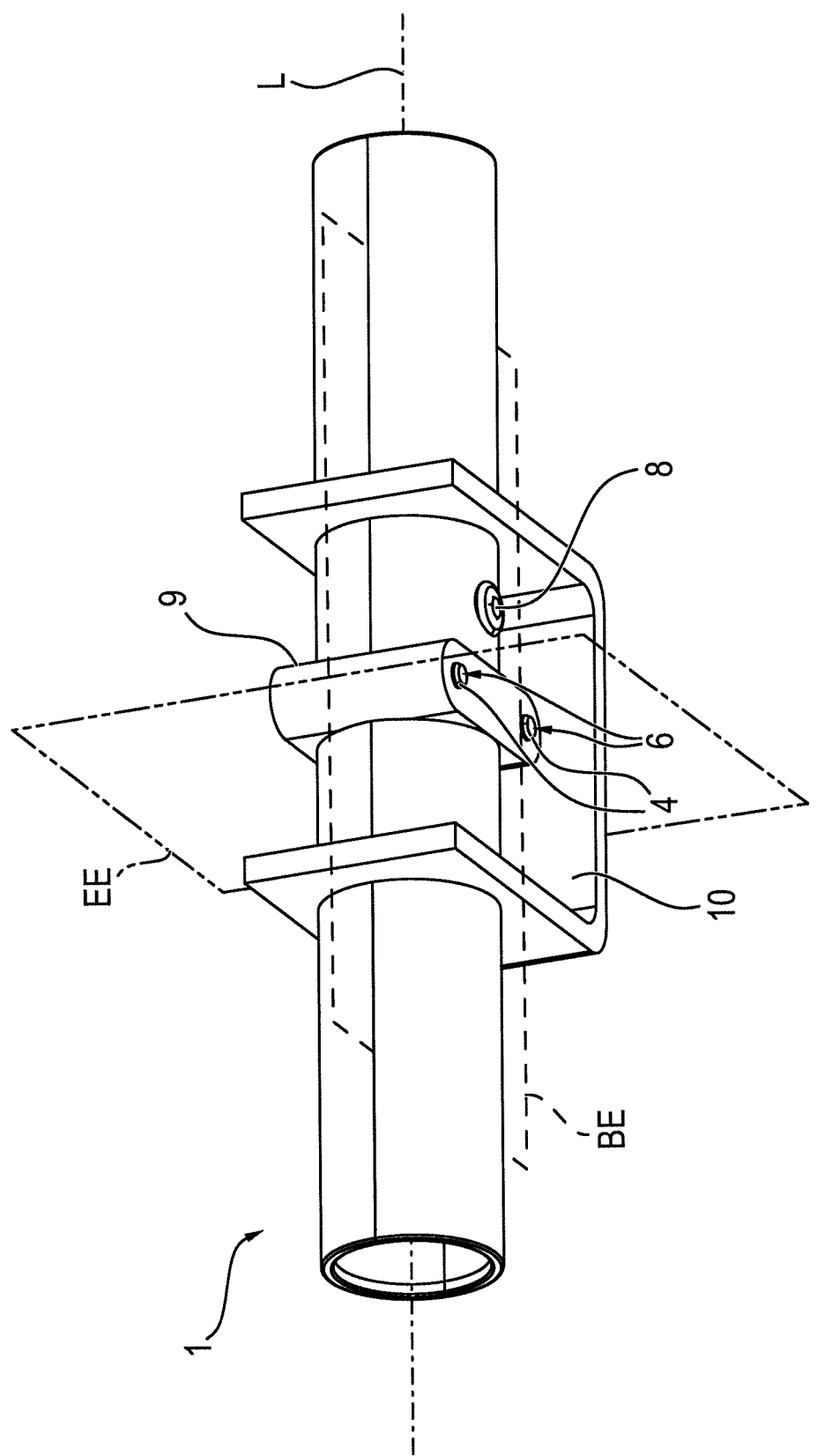
FIG. 1 is a perspective view of a measuring tube according to the invention.
Figure 6:
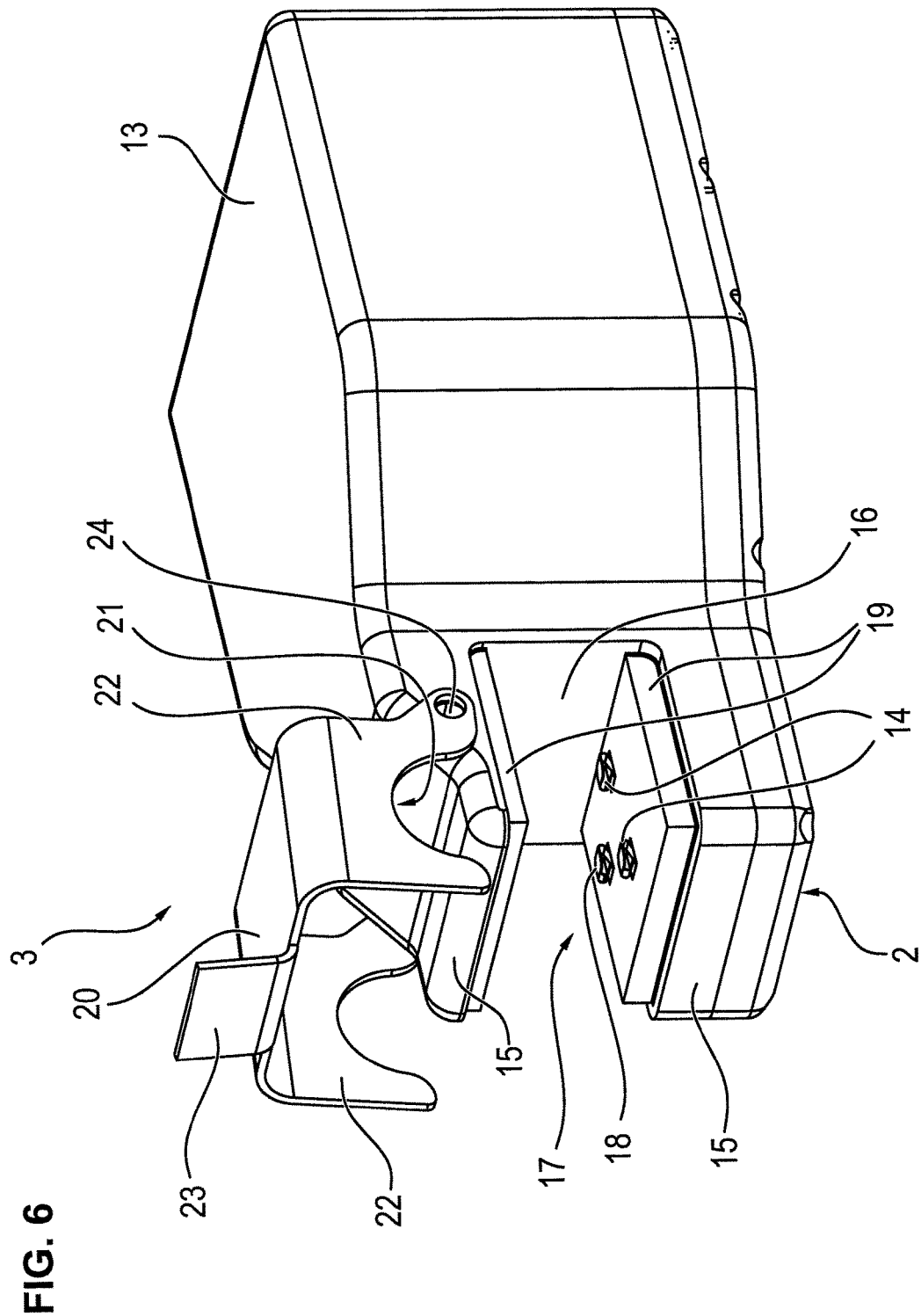
FIG. 6 is a perspective view of the magnetic-inductive flowmeter according to the invention with closure elements.
Figure 7:
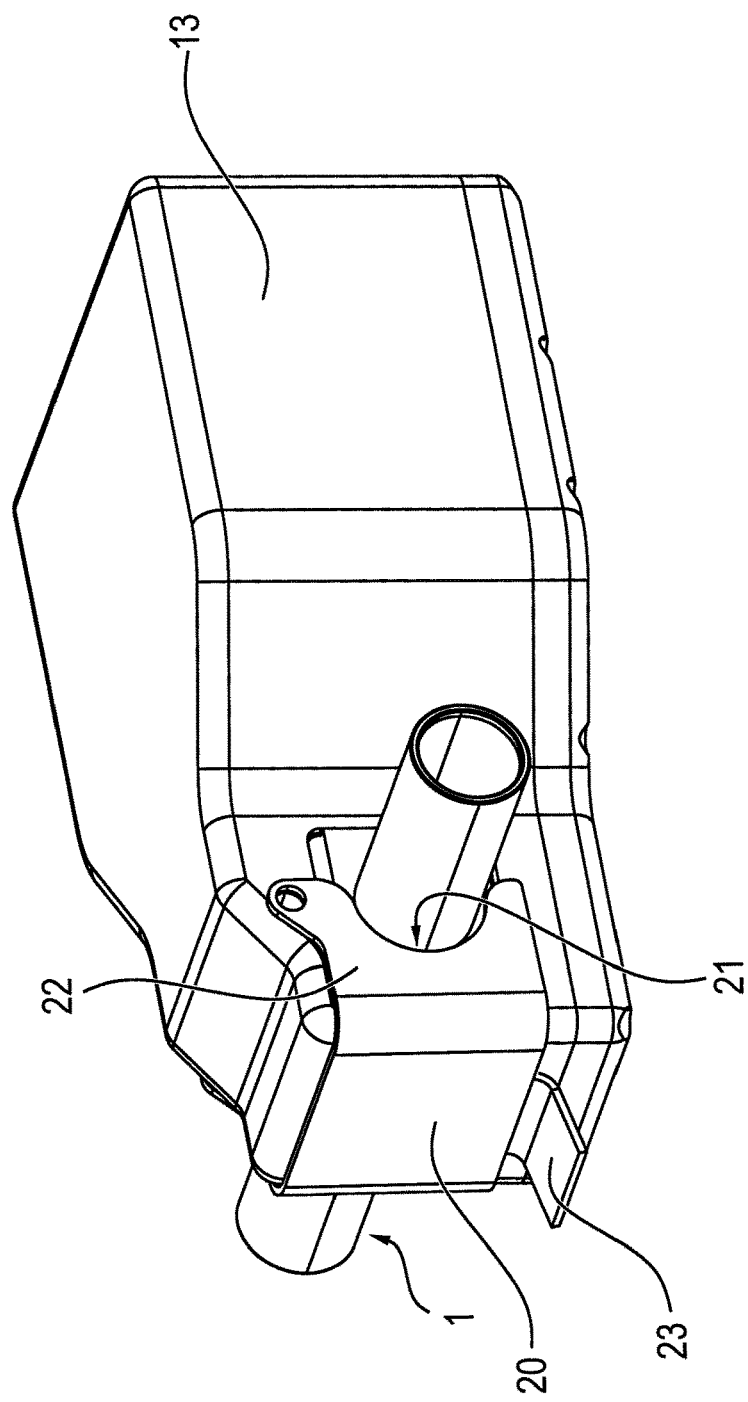
FIG. 7 is a perspective view of the magnetic-inductive flowmeter depicted in FIG. 6 with a mounted measuring tube.

FIG. 1 is a perspective view of a measuring tube 1 according to the invention that is insertable in a measuring tube receptacle 2 of one of the magnetic-inductive flowmeters 3 depicted in FIGS. 6 and 7. The measuring tube 1 is used for guiding a medium, whose flow is to be determined. Furthermore, the measuring tube 1 can be exchangeably inserted in the magnetic-inductive flowmeter 3 and essentially is intended for single use.

Figure 5:
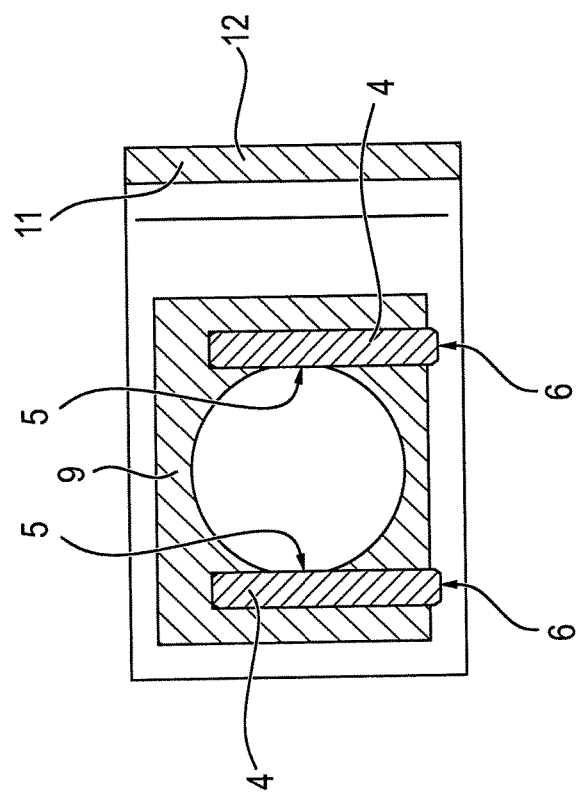
FIG. 5 is a cross section through a measuring tube according to the invention with electrodes.

The measuring tube 1 comprises two electrodes 4 for tapping a voltage induced in the medium being measured. For this, the electrodes 4 are in contact with the medium via a medium contact area 5, which cannot be seen in FIG. 1, but is depicted in FIG. 5. The electrodes 4 extend from their medium contact area 5 to a connecting contact area 6 located on one end. The connecting contact area 6 is used for connecting electrodes 4 to an evaluating unit.

Both electrodes 4 are rod-shaped and are located in an electrode plane EE, which is situated perpendicularly across the longitudinal axis L of the measuring tube 1. The electrodes 4 are arranged on both sides of the measuring tube 1 and extend parallel to one another. Furthermore, the electrodes 4 extend tangentially to the measuring tube 1. This results in that the medium contact area 5 of the rod-shaped electrodes 4 is not situated on an end, but rather is located in the middle area of the electrodes 4, which is described below in conjunction with FIG. 5.

The connecting contact areas 6 on the ends of the electrodes 4 are arranged on one side of a reference plane BE. The reference plane BE is situated perpendicular to the electrode plane EE extending along the longitudinal axis L of the measuring tube 1. Additionally, the medium contact areas 5 of the electrodes 4 are located at least partially in the reference plane BE. The arrangement of the electrodes 4 parallel to one another and tangential to the measuring tube 1 on both sides with the connecting contact area 6 on one side of the reference plane BE has the great advantage that the electrodes 4 are only contacted on one side, wherein this advantage can be seen particularly in connection with the magnetic-inductive flowmeter 2, in which the measuring tube 1 is inserted. Due to the form of the electrodes 4, contact on one side can be easily implemented, without having to provide the electrodes 4 with additional contacts or without having to form the electrodes 4 in a manner that is mechanically less stable—for example, bending them around the measuring tube.

The measuring tube 1 is made of plastic. Since the medium is electrically conductive, a grounding contact 8 is arranged on the measuring tube 1. The grounding contact 8 is used for grounding the medium and is in direct contact with the medium. The grounding contact 8 can be contacted on the side of the measuring tube 1 facing away from the medium. The grounding contact 8 is arranged on the same side of the reference plane BE, on which the connecting contact areas 6 of the electrodes 4 are also arranged. Thus, the advantage that all contacts of the measuring tube 1 occur on one side, including the contact for grounding the medium results. The electrodes 4, themselves, are arranged in electrode pockets 9 that are formed as one piece with the measuring tube 1.

In order to precisely position the measuring tube 1 in the measuring tube receptacle 2 of the magnetic-inductive flowmeter 3, the measuring tube 1 has a positioning device in the form of a positioning frame 10. The positioning frame 10 can be easily seen in FIG. 2, in which a further perspective view of the measuring tube 1 is depicted. The measuring tube 1 is depicted so that the top side of the measuring tube 1 can be seen. Accordingly, the connecting contact areas 6 of the electrodes 4 and the grounding contact 8 cannot be seen. The positioning frame 10 is formed in a U-shape and comprises two U-legs 11 and a U-base 12, wherein the U-legs 11 are penetrated by the measuring tube 1. The U-base 12, itself, extends between the two U-legs 11 in the axial direction of the measuring tube 1. The U-base plane UE defined by the U-base is situated perpendicular to both the electrode plane EE and the reference plane BE.

In the illustrated embodiment, both U-leg 11 and U-base 12 are plate-shaped. Due to the form of the positioning frame 10, the measuring tube 1 can be positioned in a simple manner in the measuring tube receptacle 2.

Figure 2:
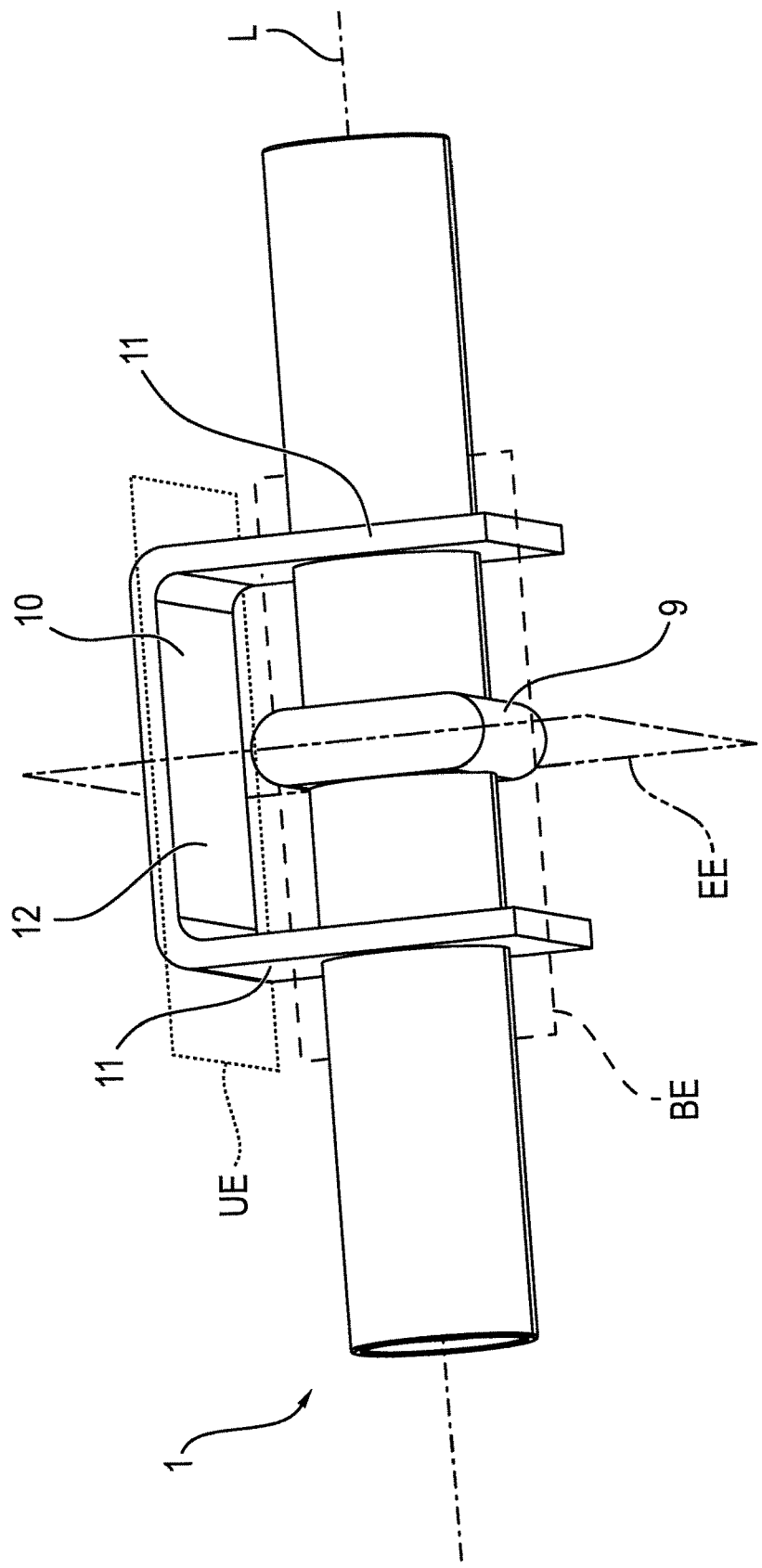
FIG. 2 is a second perspective view of the measuring tube depicted in FIG. 1.

Each of FIGS. 3a and 3b is a side view of the measuring tube 1 depicted in FIGS. 1 and 2. The U-base 12 of the positioning frame 10 can be seen in FIG. 3b.

Figure 4:
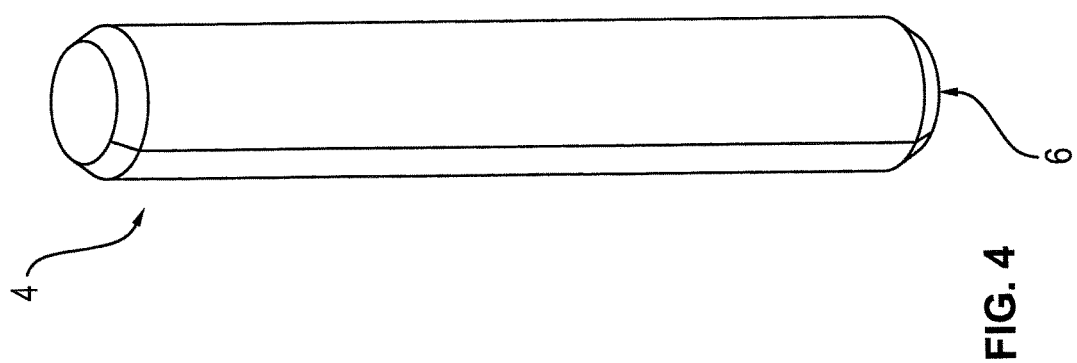
FIG. 4 is an electrode of a measuring tube according to the invention.

An electrode 4 of the measuring tube 1 is depicted in FIG. 4. The electrode 4 is designed as a round rod electrode and is symmetrically constructed. The electrode 4 is manufactured of a metal and is electrically conductive. A contact of the electrode 4 can, accordingly, be implemented at any point on the electrode 4. Preferably, an end-side connecting contact area 6 is used for contacting the electrode 4, via which the electric contact to the electrode 4 is produced.

FIG. 5 shows a cross section through the measuring tube 1 along the electrode plane EE. The medium contact areas 5 of the electrodes 4 can be seen particularly clearly here, with which the electrodes 4 are in direct contact to the medium for tapping a voltage induced in the medium.

A magnetic-inductive flowmeter 3 is depicted in FIG. 6. The magnetic-inductive flowmeter 3 comprises a measuring device housing 13 and a magnetic field generator (not shown) arranged in the measuring device housing 13 for generating a magnetic field permeating the measuring tube 1. Furthermore, the magnetic-inductive flowmeter 3 has a measuring tube receptacle 2 for receiving the measuring tube 1. The measuring tube receptacle 2 is U-shaped, thus has two U-legs 15 and a U-base 16, so that the measuring tube 1 "is inserted into the U". For this, the measuring tube receptacle 2 has an opening 17. Additionally, the magnetic field generator is arranged in the measuring device housing 13 so that the magnetic field perpendicularly permeates the U-legs 15. Thus, it is implemented that the magnetic field generator has pole shoes each extend into a U-leg 15 of the measuring tube receptacle 2. The opening 17 of the measuring tube receptacle 2 is thus situated perpendicular to the magnetic field. In order to contact the measuring tube 1, the measuring tube receptacle 2 has two counter-contacts 14. The counter-contacts 14 are formed on one of the U-legs 15 so that contact to the measuring tube 1 occurs on one side. The counter-contacts 14 are flexibly designed. If the measuring tube 1 is located in the measuring tube receptacle 2 in the contacted state, the counter-contacts 14 exert a spring force on the connecting contact areas 6 of the electrodes 4. Thus, it can be guaranteed that a stable contact is created between the connecting contact areas 6 and the counter-contacts 14 and the contact is mechanically stable and manufactured to be electrically resistant, so that a reliable measurement of the medium can take place.

In addition to the counter-contacts 14, a grounding counter-contact 18 is provided on the same U-leg 15, which is used for contact to the grounding contact 8 of the measuring tube 1. Since the measuring tube 1 is made of plastic, the electrically conductive medium has to be able to be grounded.

The measuring tube 1 is inserted into the measuring tube receptacle 2 using a movement of the measuring tube 1 perpendicular to the magnetic field. In order to create a contact between the connecting contact areas 6 of the electrodes 4 and the counter-contacts 14, the measuring tube 1 has to be subsequently moved parallel to the magnetic field in the direction of the counter-contacts 14 until contact has occurred. In order to be able to position the measuring tube 1 exactly in the measuring tube receptacle 2—and to be able to guarantee a contact and a stable fit of the measuring tube 1—the U-legs 15 have a counter holding profile 19, with which the positioning frame 10 of the measuring tube 1 can be engaged.

In order to prevent the measuring tube 1 from slipping out of the opening 17 of the measuring tube receptacle 2, the magnetic-inductive flowmeter 3 has a flap 20 acting as a closure element, with which the opening 17 of the measuring tube receptacle 2 can be closed. The flap 20 is pivotably mounted on the measuring device housing 13 and is swung downward to close the opening 17. The flap 20 has a profile 21 for receiving the measuring tube 1 so that the flap 20 closes around the measuring tube 1 with its side walls 22. In order to be able to easily open and close the flap 20, the flap 20 has a handle 23.

FIG. 7 shows the measuring tube 1 in the mounted state in the measuring tube receptacle 2 of the magnetic-inductive flowmeter 3. The flap 20 is in the closed state. The measuring tube 1 is located in the profile 21 of the flap 20. In the state shown, the measuring tube 1 is inserted in the measuring tube receptacle 2 so that slipping is prevented.

What is claimed is:

1. Measuring tube for insertion in a measuring tube receptacle of a magnetic-inductive flowmeter and for guiding a medium, comprising:
   a tubular body,
   two electrodes for tapping a voltage induced in the medium, wherein each of the electrodes at least extends from a medium contact area to a connecting contact area on one end for connection to an evaluating unit, the electrodes being arranged in an electrode plane situated perpendicular to a longitudinal axis of the tubular body and extending parallel to one another and tangential to the tubular body
   wherein the connecting contact areas are arranged on one side of a reference plane,
   wherein the reference plane is situated perpendicular to the electrode plane, and
   wherein the medium contact areas are located at least partially in the reference plane.

2. Measuring tube according to claim 1, wherein a grounding contact for grounding the medium is arranged on the tubular body, wherein the grounding contact is arranged on the same side of the reference plane as the connecting contact area of the electrodes and wherein the grounding contact is arranged to be in direct contact with the medium in use.

3. Measuring tube according to claim 1, further comprising a positioning device for positioning the measuring tube in a measuring tube receptacle of a magnetic-inductive flowmeter.

4. Measuring tube according to claim 3, wherein the positioning device comprises a U-shaped positioning frame having U-legs connected by a U-base, wherein the tubular body tends through both of the U-legs with the U-base extending in an axial direction of tubular body perpendicular to the electrode and reference planes.

5. Magnetic-inductive flowmeter for determining flow of a medium, comprising:
   an exchangeable measuring tube through which the flow to be determined passes,
   a measuring device housing with a magnetic field generator for generating a magnetic field for permeating the measuring tube,
   a measuring tube receptacle for removably receiving the exchangeable measuring tube,
   counter-contacts arranged in the measuring tube receptacle for contacting electrode connecting contact areas of the electrodes of the measuring tube,
   wherein the measuring tube receptacle is U-shaped having U-legs connected by a base-leg, the measuring tube receptacle being arranged such that the magnetic field will permeate the U-legs perpendicularly,
   wherein the measuring tube receptacle has an opening for receiving the measuring tube, the opening being located in an area of unconnected ends of the U-legs and oriented perpendicular to the magnetic field, and
   wherein the counter-contacts are located on one of the U-legs.

6. Magnetic-inductive flowmeter according to claim 5, wherein the counter-contacts are constructed to exert a spring force on the connecting contact areas of the electrodes of the measuring tube when the measuring tube is mounted in the measuring tube receptacle.

7. Magnetic-inductive flowmeter according to claim 6, wherein the measuring tube receptacle has a grounding counter-contact for contacting a grounding contact on the measuring tube, and wherein the grounding counter-contact is formed on the same U-leg as the counter-contacts for the electrodes.

8. Magnetic-inductive flowmeter according to claim 5, wherein the measuring tube receptacle has a counter holding profile for engaging a positioning frame of the measuring tube.

9. Magnetic-inductive flowmeter according to claim 5, wherein the measuring tube receptacle has a closure element for closing the opening of the measuring tube receptacle.

10. Magnetic-inductive flowmeter according to claim 9, wherein the closure element comprises a pivotable flap formed on the measuring device housing, and wherein the flap has a profile shaped for receiving a portion of the measuring tube.

* * * * *